US011503658B2

United States Patent
Kwok et al.

(10) Patent No.: US 11,503,658 B2
(45) Date of Patent: *Nov. 15, 2022

(54) SMART SCHEDULING FOR INTERMODULATION DISTORTION AVOIDANCE ON MULTIPLE UPLINK TRANSMISSIONS

(71) Applicant: T-Mobile USA, Inc., Bellevue, WA (US)

(72) Inventors: Ming Shan Kwok, Seattle, WA (US); Thomas Lucht, Seattle, WA (US); Wafik Abdel Shahid, Bellevue, WA (US); Yasmin Karimli, Kirkland, WA (US); Wei-Ming Lan, Newcastle, WA (US)

(73) Assignee: T-Mobile USA, Inc., Bellevue, WA (US)

(*) Notice: Subject to any disclaimer, the term of this patent is extended or adjusted under 35 U.S.C. 154(b) by 87 days.

This patent is subject to a terminal disclaimer.

(21) Appl. No.: 17/118,920

(22) Filed: Dec. 11, 2020

(65) Prior Publication Data

US 2021/0136851 A1 May 6, 2021

Related U.S. Application Data

(63) Continuation of application No. 16/260,017, filed on Jan. 28, 2019, now Pat. No. 10,904,935.

(51) Int. Cl.
| | |
|---|---|
| *H04W 76/15* | (2018.01) |
| *H04W 72/14* | (2009.01) |
| *H04W 72/04* | (2009.01) |
| *H04B 1/10* | (2006.01) |

(52) U.S. Cl.
CPC ............ *H04W 76/15* (2018.02); *H04B 1/109* (2013.01); *H04W 72/0453* (2013.01); *H04W 72/14* (2013.01)

(58) Field of Classification Search
CPC . H04W 76/15; H04W 72/15; H04W 72/0453; H02B 1/109
See application file for complete search history.

(56) References Cited

U.S. PATENT DOCUMENTS

| | | | |
|---|---|---|---|
| 9,231,801 B2 | 1/2016 | Rimini et al. | |
| 9,473,286 B1 * | 10/2016 | Shipley | ................ H04L 5/0085 |
| 10,420,161 B1 * | 9/2019 | Sava | ................... H04W 72/085 |
| 2015/0245349 A1 | 8/2015 | Jha et al. | |
| 2016/0302209 A1 | 10/2016 | Behravan et al. | |
| 2017/0054535 A1 | 2/2017 | Lim et al. | |

(Continued)

OTHER PUBLICATIONS

3GPP, "ETSI TS 138.101-3 version 15.2.0" Release 15, Jul. 2018, 183 pages.

(Continued)

*Primary Examiner* — Brenda H Pham
(74) *Attorney, Agent, or Firm* — Perkins Coie LLP

(57) ABSTRACT

The disclosed technology provides a system and method for scheduling downlink transmissions and for granting uplink frequency resources to a user device such that concurrent transmissions and receptions by the user device, or multiple concurrent transmissions and receptions by the user device, does not lead to deleterious intermodulation distortion or at least minimizes the extent of any such resulting intermodulation distortion.

18 Claims, 6 Drawing Sheets

(56) References Cited

U.S. PATENT DOCUMENTS

| | | | |
|---|---|---|---|
| 2018/0270792 A1 | 9/2018 | Park et al. | |
| 2019/0149184 A1* | 5/2019 | Jung | H04W 76/16 |
| | | | 455/90.2 |
| 2020/0245387 A1 | 7/2020 | Kwok et al. | |
| 2021/0211999 A1* | 7/2021 | Zhang | H04W 52/18 |
| 2021/0376989 A1* | 12/2021 | Lim | H04W 24/10 |

OTHER PUBLICATIONS

International Searching Authority, International Search Report and Written Opinion, PCT Patent Application PCT/US2020/015465, dated May 27, 2020, 9 pages.

Nokia Networks. "AAS Intermodulation Distortion Requirement," R4-146476, 3GPP TSG RAN Working Group 4 (Radio) meeting #72bis, Singapore, Sep. 29, 2014, section 8.1.5; 2 pages.

* cited by examiner

SMART SCHEDULING FOR INTERMODULATION DISTORTION AVOIDANCE ON MULTIPLE UPLINK TRANSMISSIONS

CROSS REFERENCE TO RELATED APPLICATIONS

This application is a continuation of U.S. patent application Ser. No. 16/260,017 filed Jan. 28, 2019, entitled "SMART SCHEDULING FOR INTERMODULATION DISTORTION AVOIDANCE ON MULTIPLE UPLINK TRANSMISSIONS"; which is incorporated by reference in its entirety.

BACKGROUND

5G New Radio (NR) is expected to coexist with 4G Long Term Evolution (LTE) or E-UTRAN (Evolved-UMTS Terrestrial Radio Access Network) systems both during the initial deployment phase (providing a seamless transition from 4G LTE to 5G NR) and even later when 5G is widely deployed nationwide. For example, heterogenous networks (HetNets) providing for E-UTRAN-NR Dual Connectivity (EN-DC) will exist to provide, for example, better in-building connectivity and indoor coverage using user equipment or terminal equipment simultaneously connected to 5G small cell devices and 4G macro base stations or vice-versa.

However, some of the band combinations that will be aggregated between 5G NR and 4G LTE will create high levels of intermodulation power in specific bands. This intermodulation power will create intermodulation distortion (IMD) which can desensitize the receiver, degrade the transmitted uplink (UL) and downlink (DL) signals, lead to a loss of spectrum efficiency, and lead to service quality issues to mobile operator subscribers. It is therefore beneficial to mitigate the effects of intermodulation distortion on aggregated bands, particularly IMD arising from 4G and 5G co-existence.

DETAILED DESCRIPTION

The disclosed technology provides an improved method for scheduling uplink transmissions to minimize or avoid intermodulation distortion. The technology is adapted to operate in various types of wireless communication systems including systems allowing for concurrent transmission on multiple radio access technologies such as E-UTRAN (LTE) and 5G NR. To minimize or reduce intermodulation distortion (IMD) in such cases where multiple cellular radios share transmitter resources, a smart scheduling technique is implemented at the base station to schedule the UE's UL grant on frequency channels that minimize IMD to concurrent DL transmissions. For example, when a 5G NR and an LTE radio share power amplifiers, the smart scheduling technique described below reduces or eliminates IMD. Alternatively or additionally, the smart scheduler schedules DL transmissions to the UE to avoid IMD arising from uplink transmissions by the UE and transmissions by the UE on multi-carrier UL channels.

Various embodiments of the invention will now be described. The following description provides specific details for a thorough understanding and an enabling description of these embodiments. One skilled in the art will understand, however, that the invention can be practiced without many of these details. Additionally, some well-known structures or functions may not be shown or described in detail, to avoid unnecessarily obscuring the relevant description of the various embodiments. The terminology used in the description presented below is intended to be interpreted in its broadest reasonable manner, even though it is being used in conjunction with a detailed description of certain specific embodiments of the invention.

Figure 1:
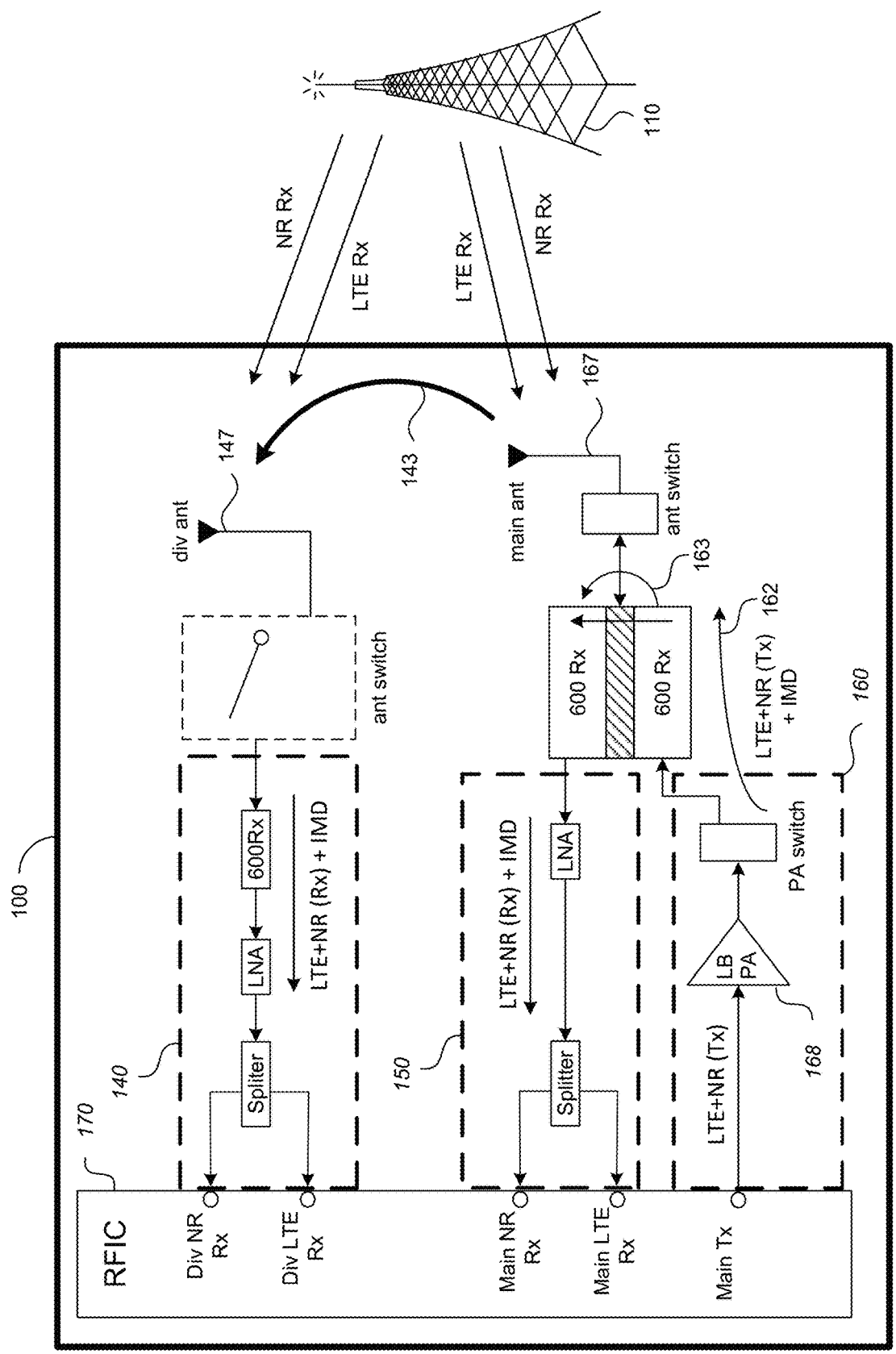
FIG. 1 is a block diagram of a representative prior art RF Front End architecture for a device supporting simultaneous uplink (UL) transmissions.

To aid in the comprehension of the disclosed technology and the problems that it solves, FIG. 1 is provided to show a representative prior art RF Front End (RFFE) architecture for a device 100 that supports simultaneous uplink transmissions, and full-duplex uplink transmissions and receptions, to/from a base station 110. For example, device 100 can be a frequency division duplex (FDD) user equipment (UE) capable of supporting intra-band contiguous or non-contiguous uplink (UL) carrier aggregation (CA) or dual-connectivity (DC) transmissions. Device 100 includes two receive paths: a main receive path 150, and a diversity receive path 140. Additionally, device 100 includes a transmit path 160. At low frequency bands, for example, sub-1 GHz bands (e.g., 450 MHz-900 MHz) some integrated components, for example, antennas tend to be quite large precluding the integration of multiple such components on some small form-factor, low cost, or low power devices to support simultaneous operation at multiple low frequency bands.

Carrier aggregation (CA) and dual connectivity (DC) are techniques used in 4G LTE and 5G NR to allow the UE to utilize the radio resources within multiple component carriers to improve the UE's throughput and reliability. Use of a single transmitter chain for aggregated-carrier systems such as DC and CA is a common architectural choice for the reasons discussed above (power, area, cost, etc.). However, several problems arise when the same transmitter chain is used to process the signals destined for different cells and carried by different component carriers, e.g., when several signals close in frequency are processed through non-linear components. One such problem is related to intermodulation distortion.

Intermodulation distortion arises due to non-linear mixing of multiple frequencies especially through high power/gain devices such as power amplifier (PA) 168. For example, device 100 can be configured to operate in E-UTRAN-NR Dual Connectivity (EN-DC) mode and transmit an NR signal in resource blocks allocated around frequency f1, and an LTE signal at resource blocks allocated around frequency f2, where f1>f2, and f1 and f2 are within the same LTE/NR frequency band. Non-linear mixing in device 100 through, for example, the PA 168 can produce second order distortion products (IM2) at frequencies f2+f1 and f241, third order intermodulation products (IM3) at frequencies 2f2-f1 and 2f1-f2, fifth order intermodulation products (IM5) at frequencies 3f2-2f1 and 3f1-2f2, etc. That is, signal 162 in device 100 would not only have the intended NR signal around frequency f1 and the intended LTE signal around frequency f2, the signal would also contain some or all of the above-identified unwanted frequencies. Typically, the most problematic intermodulation products are the third order intermodulation products 2f2-f1 and 2f1-f2, because, if f2 and f1 are close in frequency (e.g., in the same LTE/NR band), the resulting upper and lower third order products can fall within that very LTE/NR band. When the intermodulation products fall within the band of interest (i.e., the band carrying the transmitted or received data), this is a major problem because the resulting unwanted frequencies cannot easily be filtered out, for example by filter 161 (because the unwanted frequencies overlap with the intended frequencies f1 and f2). These resulting unwanted frequencies leak into the receiver paths. For example, the unwanted frequencies can leak through path 163 in the RF front end module into receiver path 150, or those frequencies could couple from main antenna 167 into diversity antenna 147 and into diversity path 140 through path 143 (e.g., through the substrate containing the antennas, through switches and other components, through power and ground rails, or via the air). These unwanted frequencies can desensitize the main and diversity receivers, thereby degrading the receivers' performance. That is, intermodulation distortion affects not just the UL signal quality, but can also degrades the DL signal quality. The problem with intermodulation distortion tends to be exacerbate the further away device 100 is from base station 110 because UL transmit power tends to be larger, thereby increasing the power of the intermodulation products. It is therefore beneficial to have a system that reduces or eliminates such intermodulation distortion products while retaining the advantages of having single transmitter chains for example in intraband multiple-component-carrier UL transmit architectures.

Figure 2:
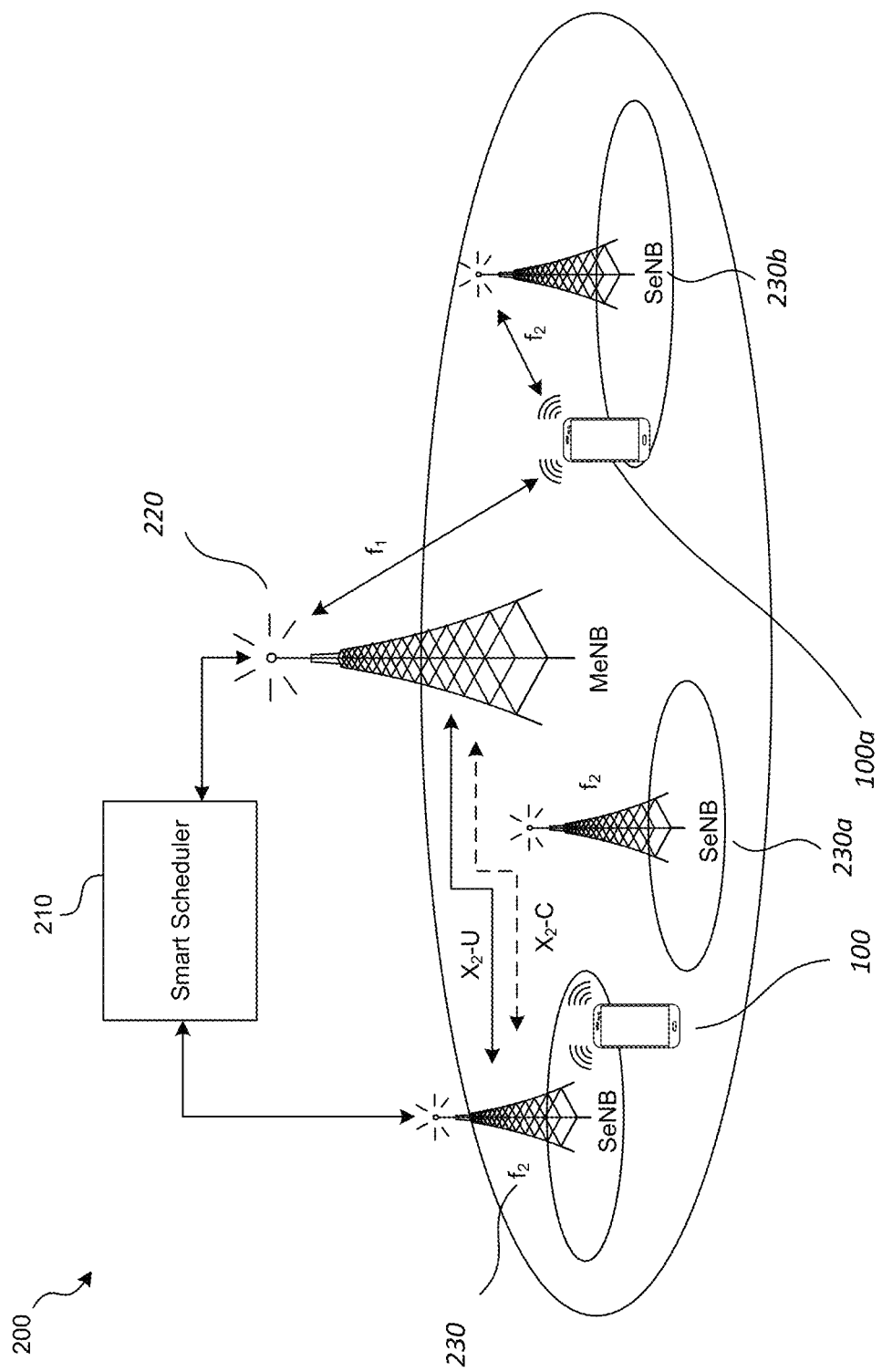
FIG. 2 is a block diagram of a representative environment where the smart intermodulation avoidance scheduler can operate.

FIG. 2 is a block diagram of a representative wireless environment 200 where a smart intermodulation (IMD) avoidance scheduler 210 can operate. Environment 200 includes user devices (e.g., user devices 100 and 100a) transmitting and receiving concurrently from/to multiple base stations, for example, small cell 5G NR base stations 230, 230a, 230b and a macro cell 4G LTE base station 220.

The smart scheduler 210 can be configured to operate in several modes depending on the radio access technology (RAT) in use by base stations 220 and 230 and user device 100. For example, smart scheduler 210 can coordinate the scheduling of DL transmissions and grants for UL transmissions by an eNodeB (eNB) for LTE radio access networks (RANs), by an ng-eNB for 5G non-standalone (NSA) access, or by a gNB for 5G standalone (SA) access. That is, for EUTRAN-NR dual connectivity (EN-DC) or carrier aggregation, the smart scheduler 210 coordinates scheduling of the EUTRAN/LTE RAN and the NR RAN so as to minimize or eliminate intermodulation distortion in user device 100. For example, base stations 220 and 230 can communicate and coordinate scheduling via the X2 protocol including the X2 user plane (X2-U) and X2 control plane (X2-C) protocols with each other and with the scheduler 210. How the smart scheduler schedules downlink transmissions and uplink grants is described next.

Figure 3:
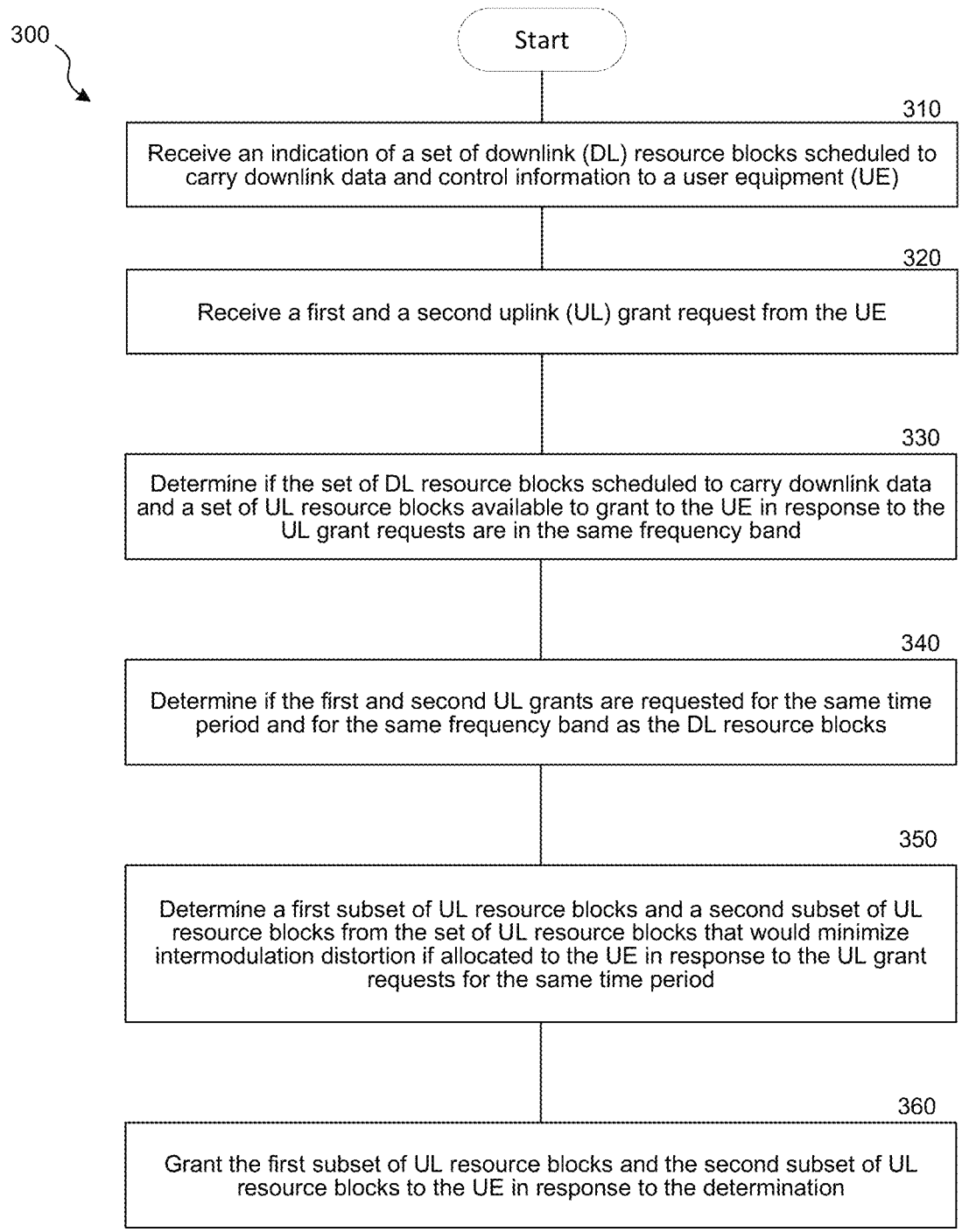
FIG. 3 is a representative flow diagram illustrating a method for granting resource blocks to a user device for concurrent uplink transmissions.

FIG. 3 is a representative flow diagram 300 illustrating a method for allocating resource blocks to a user device (e.g., device 100) for concurrent uplink transmissions to minimize or eliminate intermodulation distortion in the user device. At block 310, the smart scheduler 210 receives an indication of a set of downlink (DL) frequency resources scheduled to carry downlink user data or control information to a user equipment (UE). These downlink resources could be, for example, downlink resource blocks (RB) otherwise known as physical resource blocks (PRBs) in the physical layer. (As used herein RB, PRB, and resource block are used interchangeably.) The smart scheduler 210 can be implemented in, for example, the eNB, ng-eNB, or gNB. That is, the 4G LTE E-UTRAN network can schedule DL transmissions to the UE and grant frequency for uplink (UL) transmissions from the UE in collaboration with a scheduler in the 5G NR radio access network as described further below.

At block 320, the smart scheduler receives an UL grant request from the UE. This is a request by the UE for the EUTRAN/LTE or NR networks to allocate frequency channel(s) for the UE to use for UL transmissions. In the case of EUTRAN-NR dual connectivity (EN-DC), the downlink transmissions indicated in block 310 and the UL grant requests in block 320 can be for different radio access technologies. For example, there could be an ongoing or scheduled LTE download for the same time slots that the UE requests UL grants to send NR UL transmissions. Furthermore, for EN-DC, multiple concurrent UL transmissions are possible, so the UL grant request can be a request for an EUTRAN component carrier and an NR component carrier. Where the EUTRAN and NR component carriers are in the same band (intraband), for example EUTRAN band 71 and NR band n71, there are potential intermodulation distortion problems particularly where uplink transceiver paths are shared for the EUTRAN and NR signal paths, as discussed above. In some embodiments, device 100 includes a UE capability field to report to the enB/gNB/ng-eNB and the smart scheduler 210 whether the device 100 supports dual connectivity or single uplink operation during UE capability exchange.

At block 330, the smart scheduler 210 determines if the set of DL resources (e.g., downlink PRBs) currently in use to transmit data to the UE (or scheduled for use) are in the same frequency band. For example, if both are in a 600 MHz band such as LTE band 71 and NR band n71. As will be discussed further below, intermodulation distortion problems are not confined to cases where the component carriers are in the same frequency band and so this determination in block 330 can be skipped altogether in such embodiments. That is, in some embodiments for example where UL transmissions will cause IMD that will interfere with DL receptions at different frequency bands (e.g., as discussed below 3.5 GHs UL and 1.8 GHz downlink), block 330's determination is not necessary (the set of no-IMD resource blocks is determined in block 350 even for single UL component carriers).

At block 340, the smart scheduler 210 determines if the UL grant requests are for the same time as the DL resources in use or scheduled for use. Intermodulation distortion requires intermodulation products to occur in the same time-frequency grid as a concurrent reception or transmission so that the unwanted/spurious frequencies interfere with the intended transmissions in the affected bands.

At block 350, the smart scheduler 210 determines which of the frequencies available to grant to the UE would minimize or eliminate the intermodulation distortion on the DL frequencies currently in use or scheduled for use. There are several techniques by which the smart scheduler does this as discussed further below in relation to FIG. 4. In some embodiments, the smart scheduler contains a database or lookup table storing the intermodulation products of each combination of PRBs available to grant to the UE, and at block 350 checks if any such combinations yield an intermodulation product that overlaps in frequency with PRBs in use or schedule for use for DL. This database or memory can be located in the scheduler or located remotely (just as the scheduler could reside in en eNB/ng-eNB/gNB or a standalone network node).

At block 360, the smart scheduler grants one or more of the PRBs available to the grant to the UE if the intermodulation products of such granted PRBs (e.g., third order IMDs arising from non-linearity of power amplifier 168 in FIG. 1) do not overlap with the PRBs in use or scheduled for use for DL transmissions.

For example, if at block 310 the smart scheduler determined that PRBs in frequencies between 617 and 627 MHz were in use for DL transmissions, and at block 350 the smart scheduler determined PRBs in the frequency band between 663 and 698 MHz were available to grant to the UE (e.g., not already granted to other UEs), at block 360 the smart scheduler can grant to the UE a first set of PRBs in the NR 663-698 MHz band for use by the NR radio of the UE, and grant to the UE a second set of PRBs in the LTE 663-698 MHz band for use by the LTE radio of the UE, provided that the intermodulation product of the first set of granted PRBs and the second set of granted PRBs does not fall in the 617-627 MHz band in use for DL. The UE can then use the first set and the set for intraband carrier aggregation or intraband dual connectivity transmission.

Figure 4:
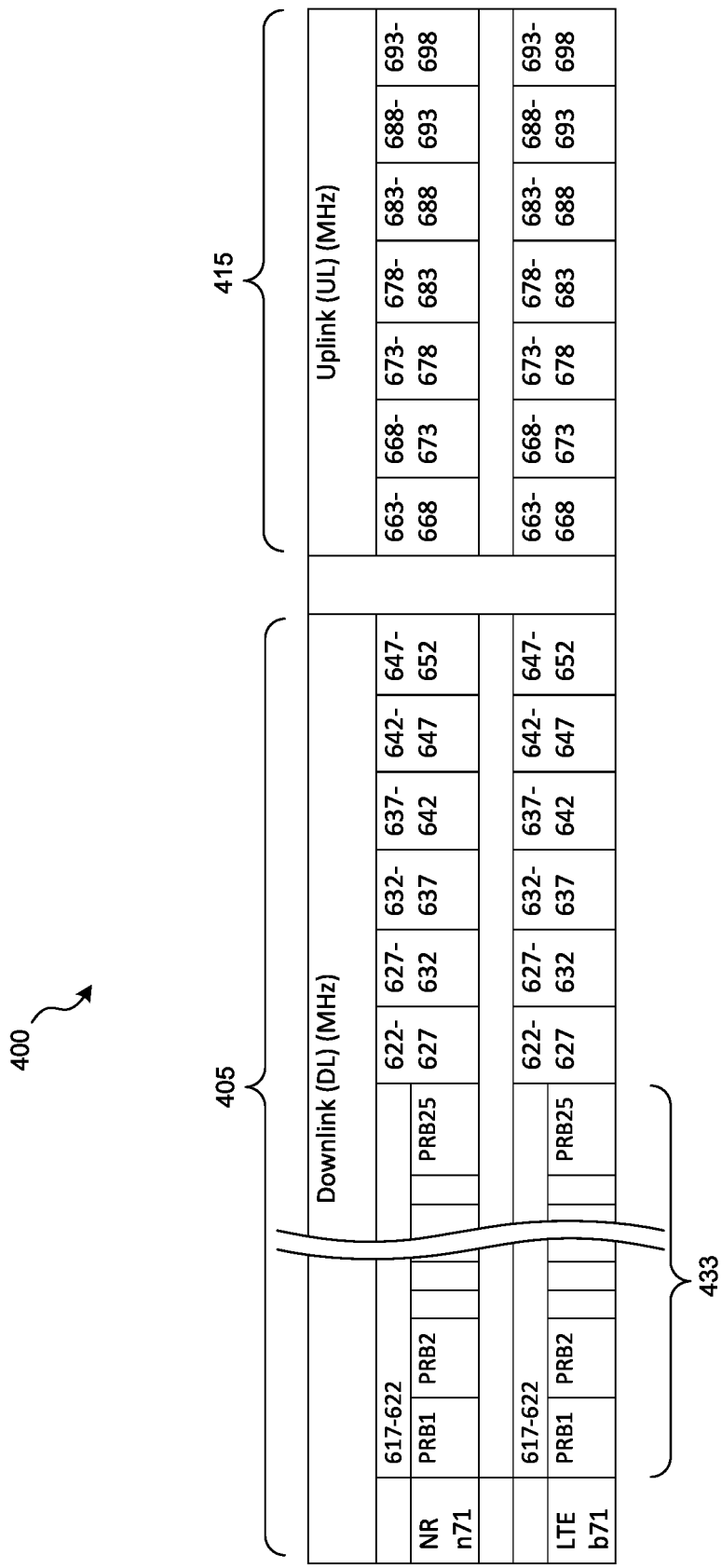
FIG. 4 is a table of a representative channel and resource block partitions for frequency bands supported by user devices compatible with different radio access technologies.

FIG. 4 is a table 400 of representative channel and resource block partitions for a frequency band used by different radio access technologies supported by a device (e.g., device 100). For example, the device 100 supports NR band n71 and E-UTRAN band 71 with 35-MHz downlink (DL) bandwidth 405 extending from 617 to 652 MHz, and a 35-MHz uplink (UL) bandwidth 315 extending from 663 to 698 MHz. Device 100 when used in these embodiments can operate, for example, with 5 MHz, 10 MHz, 15 MHz, or 20 MHz channels in the UL or DL bands 405 and 415. In embodiments where the DL and UL bands are partitioned into 5 MHz channels, with 25 resource blocks (RBs) or physical resource blocks (PRBs) in each channel (e.g., resource blocks 433), there are 7 such 5 MHz channels in the 35 MHz DL band 405 (i.e., in the 617-652 MHz band), with a total of 175 RBs/PRBs in this band. Similarly, there are 175 RBs/PRBs in the 35 MHz UL band 415 (i.e., in the 663-698 MHz band). Each of the 175 PRBs in the UL band 415 has a center frequency, for example 665.5 MHz, 670.5 MHz, 675.5 MHz, etc. Additionally, each of the frequency channels corresponding to each of the resource blocks can be defined with an EARFCN (E-UTRA Absolute Radio Frequency Channel Number) number. For example, 663 MHz can have an EARFCN=133122; 665.5 MHz can have EARFCN=133147; 698 MHz can have EARFCN=133471, etc. Similarly, each of the 175 resource blocks (RBs/PRBs) in the DL band 405 can be similarly assigned a center frequency and/or an EARFCN number to uniquely identify that block within band 405.

Similar the NR n71 band, frequencies can be assigned an NR-ARFCN number (New Radio Absolute Radio Frequency Channel Number) to uniquely identify frequencies in the NR DL and UL bands 405 and 415. For example, 663 MHz can have NR-ARFCN=132600; 665.5 MHz can have NR-ARFCN=133100; 698 MHz can have NR-ARFCN=139600, etc.

The descriptions above equally apply to embodiments where device 100 uses 10 MHz channels (e.g., with 50 PRBs), 15 MHz (e.g., with 75 PRBs), 20 MHz (e.g., with 100 PRBs), or with the flexible numerology and slot/resource block assignment defined in 5G NR. Furthermore, although the description above is cast in relation to NR band n71 and E-UTRAN/LTE band 71, the channel, resource block, and EARFCN/NR-ARFCN assignments discussed above are merely representative. The technology disclosed here is frequency band, frequency channel, and number-of-resource-block agnostic. That is, the systems and methods disclosed herein can apply equally to any device 100 that supports multiple component carriers having the characteristics discussed in this disclosure (e.g., intermodulation products fall in a band concurrently used by device 100) where the carriers are concurrently processed by the same non-linear circuits in device 100. For example, the systems and methods disclosed herein can be applied to E-UTRAN/NR dual connectivity (EN-DC) on EUTRAN/LTE FDD band 3 (at around 1.8 GHz for DL) and NR TDD band n78 (at around 3.5 GHz). The systems and methods disclosed herein avoid, for example, the inefficient time-division multiplexing (TDM) solutions proposed to handle self-interference in device 100 caused by intermodulation products, for example when device 100 is transmitting UL at 3.5 GHz and receiving DL at 1.8 GHz. That is, with the systems and methods disclosed herein, device 100 need not be prevented from receiving DL data at 1.8 GHz while transmitting UL data at 3.5 GHz.

Figure 5:
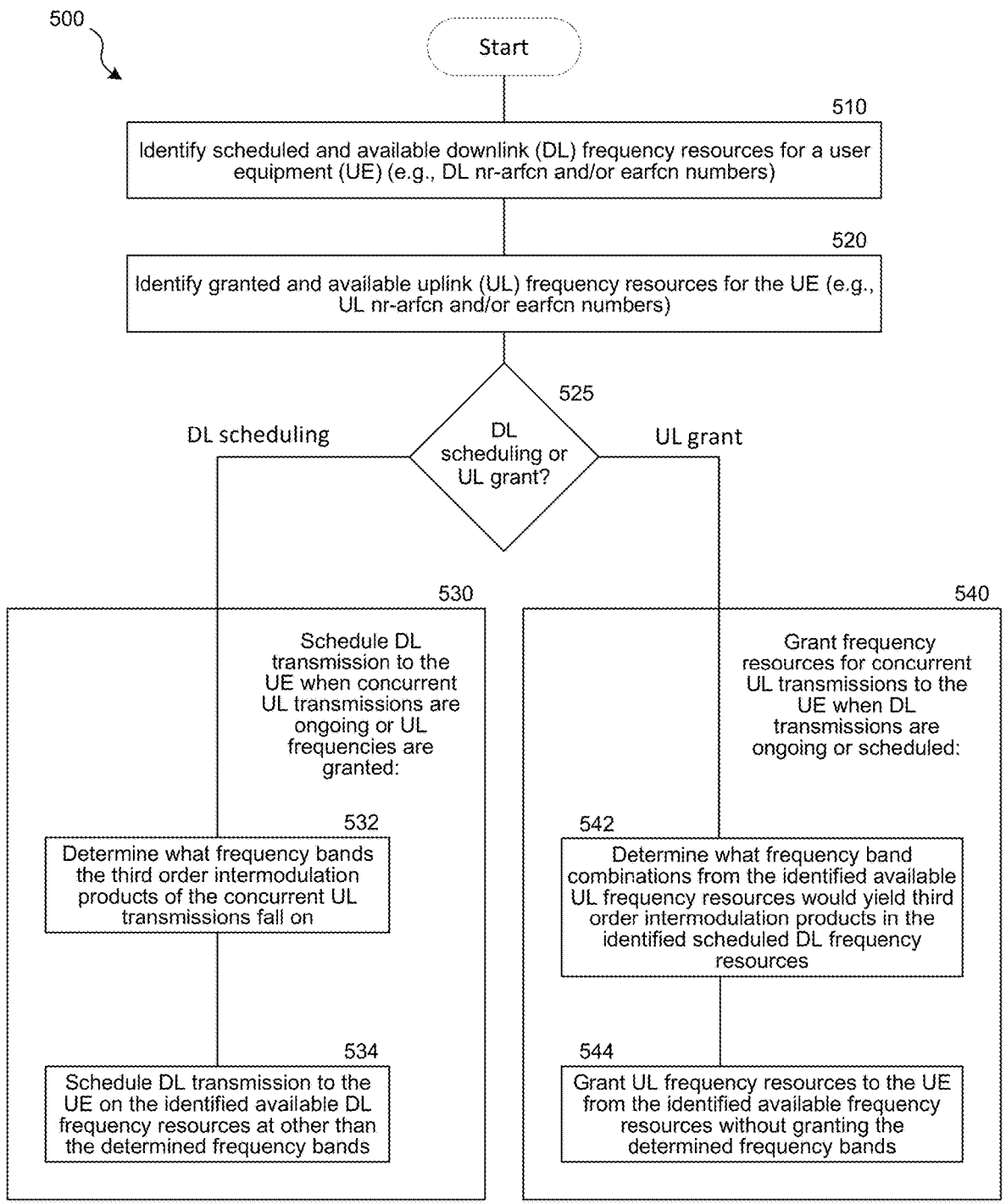
FIG. 5 is a representative flow diagram illustrating a method for allocating resource blocks to a user device to minimize intermodulation distortion in the user device.

FIG. 5 is a representative flow diagram 500 illustrating a method for allocating resource blocks (RBs/PRBs) to a user device (e.g., device 100) to minimize intermodulation distortion in the user device. The smart scheduler 210 schedules downlink transmissions to device 100 or grants uplink frequency resources to device 100 to minimize intermodulation distortion in device 100, for example, where device 100 shares uplink transmitter resources between component carriers in the case for EUTRAN/NR dual connectivity.

At block 510 the smart scheduler identifies scheduled and available DL frequency resources for device 100. As discussed above in relation to FIG. 3, this can include identifying the nr-arfcn and/or earfcn numbers, or the center frequencies, or the PRB numbers allocated for use (or currently in use) for DL transmission. At block 520 the smart scheduler does the same for granted and available UL frequency resources. At block 525, the smart scheduler determines if it is scheduling DL transmissions or needs to grant UL resources to device 100. In the case where the smart scheduler needs to schedule DL transmissions (block 530), the scheduler selects DL frequency resources from the available frequency resource identified in block 510 to minimize intermodulation distortion, considering the UL frequency resources in use (or scheduled for use in the same time slot) as identified in block 520. Similarly, in the case where the smart scheduler needs to grant device 100 frequency resources for it to use for UL transmissions (block 540), the scheduler allocates frequency resources from the available UL frequencies identified in block 520 taking into considering the identified DL frequencies in use or scheduled for use in the same time slot as the granted UL frequencies. The smart scheduler's goal in scheduling DL or granting UL frequencies is to minimize IMD in device 100.

Downlink scheduling by the EUTRAN's eNB or NR's gNB/ng-eNB under the control of the smart scheduler 210 will first be discussed below. followed by uplink grants by the EUTRAN's eNB or NR's gNB/ng-eNB under the control of the smart scheduler 210.

Downlink (DL) Scheduling

At block 530, the smart scheduler determines that it needs to schedule DL transmissions to the UE when there are concurrent UL transmissions or when UL frequencies are granted at the same time slot. As discussed above in relation to FIG. 3, intermodulation issues can result not only from EUTRAN/NR dual connectivity when there are concurrent UL transmissions whose IMD products can leak into DL transmissions, but IMD issues can also result from single UL transmissions where IMD products from the single carrier UL interferes with DL transmissions.

At block 532, in the case of concurrent UL transmissions, the smart scheduler determines the intermodulation products corresponding to the concurrent UL transmission frequencies. For example, if the first UL component carrier is at frequency f1 and the second UL component carrier is at frequency f2, the smart scheduler determines the upper third order intermodulation (IM3) product at 2*f2−f1 (for f2>f1) and the lower IM3 product at 2*f1−f2 (for f2>f1). For example, if f1=668 MHz and f2=688 MHz, the upper intermodulation product would be at 708 MHz; and the lower intermodulation product would be at 648 MHz. Because 648 MHz is in LTE Band 71 and NR band n71 DL band (see FIG. 4, section 405), the concurrent UL transmissions would interfere with DL transmissions utilizing the resource blocks at these channels occupying 648 MHz. As a result, at block 534 the smart scheduler would schedule DL transmissions at any other PRBs available (as determined in block 510) other than the PRBs where the IMD components fall (i.e., from our example above, anywhere except PRBs occupying 648 MHz). That is, the smart scheduler can block out the EARFCNs or NR-ARFCNs corresponding to those blocks of frequencies affected by IMD arising from the concurrent UL transmissions. As discussed above, even without concurrent UL transmissions, single carrier UL transmissions on PRBs spanning multiple frequencies can result in IMD components landing on the frequency bands available to schedule DL transmissions and those bands must be avoided as well in the single carrier case.

Uplink (UL) Grant

The UL grant case in block 540 is like the DL scheduling case discussed above in relation to block 530, only that now the scheduler is trying to allocate UEs frequencies that the UEs can use for UL transmissions given ongoing DL transmissions or DL transmissions scheduled for the same time slots. At block 542, the smart scheduler determines which of the band combinations from the frequency resources identified as available to schedule to the UE in block 520 would yield intermodulation products that overlap in frequency with resource blocks in use or schedule for use for DL transmissions (as identified in block 510). At block 544, the smart scheduler schedules the UE with frequency resources from those identified in block 520 except the scheduler avoids those combinations identified in block 542.

For example, at block 510 the smart scheduler can determine that the UE is currently receiving downloads on PRBs occupying 648 MHz. Additionally, at block 520 the smart scheduler can determine that the following UL LTE frequencies are available to schedule 4G LTE UL transmissions to the EUTRAN network {f1_1=668 MHz, f1_2=663 MHz} and the following NR frequencies are available to schedule NR transmissions to the NR network {f2_1=688 MHz, and f2_2=693 MHz}. That is, the smart scheduler determines that it is free to allocate PRBs occupying 668 MHz or those occupying 663 MHz to the UE's first component carrier (the LTE carrier) (CC1), and the scheduler is free to allocate PRBs occupying 688 MHz and those occupying 693 MHz to the UE's second component carrier (the NR carrier) (CC2).

From the example above, the smart scheduler determines in block 542 that if it allocated 668 MHz to CC1 and 688 MHz to CC2, the IMD product would fall on 648 MHz. At block 544, the smart scheduler knows to avoid this band combination because it was determined at block 510 that 648 MHz is in use for DL transmissions. Conversely, the smart scheduler at block 542 determines that if it allocated 668 MHz to CC1 and 693 MHz to CC2, the resulting IMD would fall in 643 MHz. If none of the PRBs allocated for DL transmission occupies 643 MHz, the smart schedule knows that it can allocate this band combination at block 544.

In some embodiments, the smart scheduler constructs and stores the IMD products resulting from different permutations and combinations of component carriers that can be allocated to a UE. That way, in blocks 530 and 540, the smart scheduler looks up from a stored database or lookup table to determine what PRBs are safe to use for DL transmissions given what is being used for UL, or what PRBs are safe to allocate for UL use given what is in use for DL.

Different IMD mitigation criteria or strategies may be adapted. For example, to keep IMD within the same UL band, the smart scheduler can allocate the component carrier frequencies closer together so that IMD falls within the UL band but outside an UL channel that the device currently using. For example, if the smart scheduler allocated CC1 to 668 MHz and CC2 to 670 MHz the lower products would fall on 666 MHz and the upper product on 672 MHz. If device 100 is not using 666 and 672 MHz for UL transmission, this allocation results in little UL degradation from IMD, and little/no DL degradation because the IMDs do not fall in DL bands. The selection of CC1 and CC2 can be tailored such that the upper and lower products fall outside the bandpass of a practical band pass filter than can be implemented in device 100 to filter out unwanted products. In some embodiments, the smart scheduler considers the size of channels used by the user device (e.g., 5 MHz, 10 MHz, 15 MHz, or 20 MHz) to allow for narrower filtering. The frequency offset in which PRBs are allocated is also relevant to determine the granularity by which the smart scheduler can allocate frequencies (e.g., small frequency offsets lead to more permutations and combinations of frequencies to consider when making scheduling/grant decisions).

Figure 6:
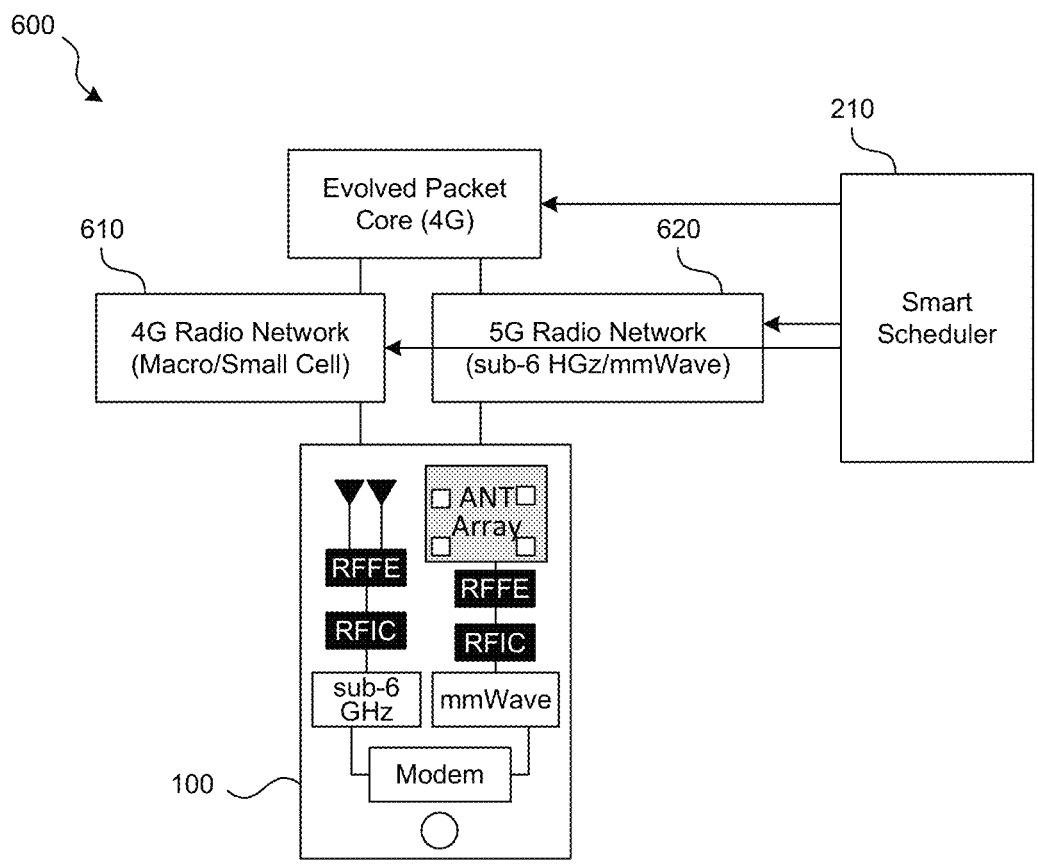
FIG. 6 is a block diagram of a representative user device scheduled by the smart IMD avoidance scheduler and supporting non-standalone (NSA) 5G NR and E-UTRAN dual connectivity.

FIG. 6 is a block diagram 600 of a representative user device (e.g., user device 100) scheduled by the smart IMD avoidance scheduler (e.g., smart scheduler 210) configured to concurrently operate with an EUTRAN (4G LTE) macro or small cell base station 610, and a 5G NSA NR base station 620. Small cells are an essential ingredient for the densification of next generation networks required to meet the goals of 5G NR and therefore dual connectivity through small cells, for example, in base station 610 is going to be a common configuration.

The intermodulation distortion problem discussed above (e.g., in relation to FIGS. 3, 4, and 5) is exacerbated when the different components carriers are in the same band (intraband), particularly for the E-UTRAN/NR dual connectivity (EN-DC) case of diagram 600 where the first transmission is targeted to the E-UTRAN/LTE radio network 610 and the second transmission is targeted to the 5G NR network 620. This is because, unlike for the CA case where the eNB or ng-eNB can turn off intraband component carriers and revert to single carrier transmission when problems are detected, the EN-DC configuration often requires having both carriers active for full-duplex transmit/receive operation.

Even where simultaneous uplink transmissions for intra-band contiguous eUTRAN/New-Radio dual connectivity (EN-DC) may not be required by 3GPP standards, it is still beneficial for devices to allow for this as this leads to better spectral efficiency. The technology disclosed here allow for user devices to support such non-mandatory dual connectivity cases without any changes to the user device hardware. Furthermore, the systems and methods disclosed herein are frequency agnostic and so may be adapted for any frequency band for example E-UTRA/LTE band 41 and 5G NR band n41 at 2496-2690 MHz, E-UTRA/LTE band 41 and 5G NR band n41 at 2496-2690 MHz, LTE band 3 and NR band n78, and others.

Remarks

The Figures and above description provide a brief, general description of a suitable environment in which the invention can be implemented. Although not required, aspects of the invention can be implemented in the general context of computer-executable instructions, such as routines executed by a general-purpose data processing device, e.g., a server computer, wireless device or personal computer. Those skilled in the relevant art will appreciate that aspects of the invention can be practiced with other communications, data processing, or computer system configurations. The terms "computer," "server," and the like are generally used interchangeably herein, and refer to any of the above devices and systems, as well as any data processor.

Aspects of the invention can be embodied in a special purpose computer or data processor that is specifically programmed, configured, or constructed to perform one or more of the computer-executable instructions explained in detail herein. While aspects of the invention, such as certain functions, are described as being performed exclusively on a single device or single computer, the invention can also be practiced in distributed environments where functions or modules are shared among disparate processing devices, which are linked through a communications network, such as a Local Area Network (LAN), Wide Area Network (WAN), or the Internet. In a distributed computing environment, program modules can be in both local and remote memory storage devices. Aspects of the invention can be stored or distributed on tangible computer-readable media, including magnetically or optically readable computer discs, hard-wired or preprogrammed chips (e.g., EEPROM semiconductor chips), nanotechnology memory, biological memory, or other data storage media.

Unless the context clearly requires otherwise, throughout the description and the claims, the words "comprise," "comprising," and the like are to be construed in an inclusive sense, as opposed to an exclusive or exhaustive sense; in the sense of "including, but not limited to." As used herein, the terms "connected," "coupled," or any variant thereof means any connection or coupling, either direct or indirect, between two or more elements; the coupling or connection between the elements can be physical, logical, or a combination thereof. Additionally, the words "herein," "above," "below," and words of similar import, when used in this application, refer to this application as a whole and not to any particular portions of this application. Where the context permits, words in the above Detailed Description using the singular or plural number may also include the plural or singular number respectively. The word "or" in reference to a list of two or more items covers all of the following interpretations of the word: any of the items in the list, all of the items in the list, and any combination of the items in the list.

The above Detailed Description of examples of the invention is not intended to be exhaustive or to limit the invention to the precise form disclosed above. While specific examples for the invention are described above for illustrative purposes, various equivalent modifications are possible within the scope of the invention, as those skilled in the relevant art will recognize. For example, while processes or blocks are presented in a given order, alternative implementations can perform routines having steps/blocks, or employ systems having blocks, in a different order, and some processes or blocks can be deleted, moved, added, subdivided, combined, and/or modified to provide alternative or subcombinations. Each of these processes or blocks can be implemented in a variety of different ways. Also, while processes or blocks are at times shown as being performed in series, these processes or blocks can instead be performed or implemented in parallel, or can be performed at different times. Further any specific numbers noted herein are only examples: alternative implementations can employ differing values or ranges.

The teachings of the invention provided herein can be applied to other systems, not necessarily the system described above. The elements and acts of the various examples described above can be combined to provide further implementations of the invention. Some alternative implementations of the invention can include not only additional elements to those implementations noted above, but also can include fewer elements.

Any patents and applications and other references noted above, including any that may be listed in accompanying filing papers, are incorporated herein by reference. Aspects of the invention can be modified, if necessary, to employ the systems, functions, and concepts of the various references described above to provide yet further implementations of the invention. When statements or subject matter in an incorporated by reference conflict with statements or subject matter of this application, then this application shall control.

These and other changes can be made to the invention in light of the above Detailed Description. While the above description describes certain examples of the invention, and describes the best mode contemplated, no matter how detailed the above appears in text, the invention can be practiced in many ways. Details of the system can vary considerably in its specific implementation, while still being encompassed by the invention disclosed herein. As noted above, terminology used when describing certain features or aspects of the invention should not be taken to imply that the terminology is being redefined herein to be restricted to any specific characteristics, features, or aspects of the invention with which that terminology is associated. In general, the terms used in the following claims should not be construed to limit the invention to the specific examples disclosed in the specification, unless the above Detailed Description section explicitly defines such terms. Accordingly, the actual scope of the invention encompasses not only the disclosed examples, but also all equivalent ways of practicing or implementing the invention under the claims.

To reduce the number of claims, certain aspects of the invention are presented below in certain claim forms, but the applicant contemplates the various aspects of the invention in any number of claim forms. For example, certain aspects of the disclosed system be embodied as a means-plus-function claim, or in other forms, such as being embodied in a computer-readable medium. (Any claims intended to be treated under 35 U.S.C. § 112(f) will begin with the words "means for", but use of the term "for" in any other context is not intended to invoke treatment under 35 U.S.C. § 112(f).) Accordingly, the applicant reserves the right to pursue additional claims after filing this application to pursue such additional claim forms, in either this application or in a continuing application.

We claim:

1. At least one non-transitory computer-readable medium, carrying instructions, which when executed by at least one cellular network node, performs operations, comprising:
   identify downlink (DL) frequency resources available for transmission to a user equipment (UE);
   identify in-use or granted UE uplink (UL) frequency resources,
      wherein an UL frequency resource corresponds to a first radio access technology (RAT), different from a second RAT, and
      wherein the DL frequency resources available for transmission to the UE use the second RAT;
   determine at least one frequency a predetermined position or frequency away from the in-use or granted UL frequency resources;
   determine a schedule for DL transmissions to the UE on the identified DL frequency resources other than on the determined at least one frequency; and
   based on the schedule, cause a base station to transmit DL transmissions using one or more amplifiers,
      wherein the base station has first and second radios for the first and second RATs, respectively,
      wherein the first and second radios share the one or more amplifiers, and
      wherein the schedule minimizes or reduces intermodulation distortion (IMD) of the one or more amplifiers.

2. The least one computer-readable medium of claim 1, wherein the cellular network node is configured for concurrent UL transmissions comprising concurrent E-UTRAN and 5G NR UL transmissions, and wherein the E-UTRAN and the 5G NR UL transmissions are on the same frequency band.

3. The at least one computer-readable medium of claim 1, wherein the cellular network node is configured for concurrent UL transmissions comprising dual connectivity transmissions with multiple uplink component carriers, and wherein each one of the component carriers in the multiple uplink component carriers is in the same frequency band.

4. The at least one computer-readable medium of claim 1, further comprising identifying UL frequency resources in use by the UE for concurrent uplink (UL) transmissions or granted to the UE for use for concurrent UL transmissions, and comprising identifying at least one of a E-UTRAN Absolute Radio Frequency Channel Number (EARFCN) that uniquely identifies DL and UL frequency resources in a E-UTRAN radio access network, and a New Radio Absolute Radio Frequency Channel Number (NR-ARFCN) that uniquely identifies the DL and UL frequency resources in a NR radio access network.

5. A computing device for use with a wireless network, the device comprising:
   at least one hardware processor; and
   at least one tangible memory, storing instructions, which when executed by the at least one hardware processor, performs operations including:
      identifying downlink (DL) frequency resources available for transmission to a user equipment (UE);
      identifying in-use or granted UE uplink (UL) frequency resources,
         wherein an UL frequency resource corresponds to a first radio access technology (RAT), different from a second RAT, and
         wherein the DL frequency resources available for transmission to the UE use the second RAT;
      determining at least one frequency a predetermined position or frequency away from the in-use or granted UL frequency resources;
      determining a schedule for DL transmissions to the UE on the identified DL frequency resources other than on the determined at least one frequency;
      based on the schedule, causing a base station to transmit DL transmissions using one or more amplifiers,
         wherein the base station has first and second radios for the first and second RATs, respectively,
         wherein the first and second radios share the one or more amplifiers, and
         wherein the schedule minimizes or reduces intermodulation distortion (IMD) of the one or more amplifiers.

6. The device of claim 5, further comprising receiving an indication of a set of downlink (DL) resource blocks scheduled to carry downlink information to the UE, wherein the downlink information comprises downlink data or downlink control information.

7. The device of claim 5, further comprising receiving first and second uplink UL grant requests, which are requests for frequency resources for concurrent UL transmissions on different intra-band component carriers, and wherein at least one component carrier of the intra-band component carriers corresponds to the first or second RAT, and wherein the concurrent UL transmissions comprise a concurrent E-UTRAN UL transmission and a New Radio (NR) UL transmission.

8. The device of claim 5, further comprising receiving first and second uplink UL grant requests for frequency resources for concurrent UL transmissions, wherein the concurrent UL transmissions comprise dual connectivity transmissions with multiple uplink component carriers, and wherein each one of the component carriers in multiple component carriers is in the same frequency band.

9. The device of claim 5, further comprising receiving first and second uplink UL grant requests are requests for frequency resources for concurrent UL transmissions, wherein the concurrent UL transmissions comprise multiple-uplink, carrier aggregation transmissions.

10. The device of claim 5, further comprising receiving first and second UL grant requests from the UE,
    wherein the first and second UL grant requests are requests for frequency resources for concurrent UL transmissions on different intra-band component carriers, wherein the different intra-band component carriers comprise component carriers in E-UTRAN band 71 and component carriers in NR band n71, and
    wherein the E-UTRAN band 71 band and the NR band n71 operate around 600 MHz.

11. The device of claim 5, further comprising selecting a first and second subsets of UL resource blocks,
    wherein the first and second subsets of UL resource blocks are selected to minimize intermodulation distortion products created by a transceiver block in the UE, wherein the intermodulation distortion products created by the transceiver block in the UE comprise third order intermodulation products created by a power amplifier configured to concurrently amplify a first signal carried by the first subset of resource blocks, and a second signal carried by the second subset of resource blocks.

12. An apparatus configured to receive a grant of user equipment (UE) frequency resources for uplink (UL) transmissions within a wireless network of a first radio access technology (RAT) operating in a dual connectivity mode with a second RAT, different from the first RAT, the apparatus comprising:
at least one processor configured to communicate with the wireless network; and
at least one non-transitory memory, coupled to the at least one processor, and storing instructions for:
receiving scheduling for downlink (DL) transmissions for use by the apparatus on identified DL frequency resources other than on a determined at least one frequency,
wherein the identified DL frequency resources are identified as being available for the UE;
wherein in-use or granted UE uplink (UL) frequency resources are identified,
wherein an UL frequency resource corresponds to the first radio access technology (RAT), different from the second RAT, and
wherein the at least one frequency is a predetermined position or frequency away from the in-use or granted UL frequency resources
based on the scheduling, causing one or more amplifiers to transmit DL transmissions,
wherein first and second radios share the one or more amplifiers,
wherein the first and second radios are for the first and second RATs, respectively, and
wherein the scheduling minimizes or reduces intermodulation distortion (IMD) of the one or more amplifiers.

13. The apparatus of claim 12, wherein the first RAT and the second RAT comprise Evolved-UMTS Terrestrial Radio Access Network (E-UTRAN) or 5G New Radio (NR) radio access technologies, and wherein the UL transmissions comprise concurrent E-UTRAN UL transmissions, concurrent NR UL transmissions, or concurrent E-UTRAN and NR UL transmissions.

14. The apparatus of claim 12, wherein first and second uplink UL grant requests are received that are requests for frequency resources for concurrent UL transmissions, wherein the concurrent UL transmissions comprise concurrent E-UTRAN UL transmission in E-UTRAN band 71 at around 600 MHz, and NR UL transmissions in NR and n71 at around 600 MHz, and the DL transmissions comprise E-UTRAN DL transmissions in E-UTRAN band 71 or NR DL transmissions in NR band n71.

15. The apparatus of claim 12, wherein the DL transmissions comprise E-UTRAN band 3 DL transmissions at around 1.8 GHz, and wherein the UL transmissions comprise NR band n78 UL transmissions at around 3.5 GHz.

16. The apparatus of claim 12, wherein multiple frequency resources are identified in use for the DL transmissions to the UE or scheduled for use for the DL transmissions to the UE, and multiple frequency resources are identified as available to grant to the UE for UL transmissions, and at least one of a E-UTRAN Absolute Radio Frequency Channel Number (EARFCN) is identified that uniquely identifies DL and UL frequency resources in a E-UTRAN radio access network, and a New Radio Absolute Radio Frequency Channel Number (NR-ARFCN) is identified that uniquely identifies DL and UL frequency resources in a NR radio access network.

17. The apparatus of claim 12, wherein first and second subsets of frequency resources are identified based on coordination between an EUTRAN scheduler and a 5G NR scheduler.

18. The apparatus of claim 17, wherein the 5G NR operates in at least one of a next generation NodeB (gNB) and a next generation eNodeB (ng-eNB).

* * * * *